US007877348B2

(12) United States Patent
Verschell et al.

(10) Patent No.: US 7,877,348 B2
(45) Date of Patent: *Jan. 25, 2011

(54) LAYOUT AWARE CALCULATIONS

(75) Inventors: Henry Verschell, San Francisco, CA (US); Raghuram Venkatasubramanian, Union City, CA (US); Steve Cave, Gloucester (GB); Martin Roth, Ashland, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,664

(22) Filed: Sep. 11, 2009

(65) Prior Publication Data

US 2010/0077326 A1 Mar. 25, 2010

Related U.S. Application Data

(63) Continuation of application No. 10/641,393, filed on Aug. 13, 2003, now Pat. No. 7,590,613, which is a continuation-in-part of application No. 10/639,291, filed on Aug. 11, 2003, now abandoned.

(51) Int. Cl.
G06F 17/00 (2006.01)
(52) U.S. Cl. .................. 707/600; 707/726; 707/771; 707/E17.128; 707/999.004
(58) Field of Classification Search .......... 707/600, 707/726, 739, 771, 802, 930, 934, E17.062, 707/E17.078, E17.128, 999.004
See application file for complete search history.

(56) References Cited

U.S. PATENT DOCUMENTS 5,713,020 A * 1/1998 Reiter et al. ................ 1/1
5,832,475 A 11/1998 Agrawal et al.
5,970,493 A * 10/1999 Shoup et al. ................ 1/1
2004/0006574 A1 1/2004 Witkowski et al.
2004/0128289 A1 7/2004 Cochrane et al.

OTHER PUBLICATIONS

Ed Kosciuszko, Analytical Functions in Oracle 8i, Dec. 17, 2001, SeQuel Consulting, pp. 1-34.*
Koutsoukis et al., Adapting on-line analytical processing for decision modelling: the interaction of information and decision technologies, 1999 Elsevier, pp. 1-30.*
Iteliano et al., A Hybrid Model for Data Synchronism in Data Warehouse Project, 2003 IEEE, pp. 1-10.*
Rauber et al., An Architecture for Modular On-Line Analytical Processing Systems: Supporting Distributed and Parallel Query Processing Using Co-operating COBRA Objects, 2002, pp. 1-5.*
Ed Kosciuszko, Analytical Functions in Oracle 8i, Dec. 17, 2001, pp. 1-34, SeQuel Consulting.
A. Billington, Introduction to 8i Analytic Functions, Apr. 2002, pp. 1-9, Quest Software.

* cited by examiner

Primary Examiner—Fred I Ehichioya
(74) Attorney, Agent, or Firm—Townsend and Townsend and Crew LLP

(57) ABSTRACT

A method for analyzing data from a database using an analytic database function includes receiving a selection of measured items from a user, receiving a placement item from the user, and determining a partitioning of the selection of measured items from the placement item. A placement item can be a column, a row, or an axis. A template associated with the analytic database function is adapted to define at least one partitioning relative to the placement item. The template is further adapted to define an ordering parameter for the analytic database function and optionally an aggregation level for the analytic database function. A database query is created with the partitioning. The database query can be an SQL statement.

22 Claims, 6 Drawing Sheets

| | | Profit | Lag by Year |
|---|---|---|---|
| 1999 | Q1 | 134775.5 | |
| | Q2 | 142700.6 | |
| 2000 | Q1 | 186944.4 | 134775.49 |
| | Q2 | 197840.5 | 142700.63 |

205

ADD MONTH

| | | | Profit SUM | Lag by Year |
|---|---|---|---|---|
| 1999 | Q1 | Jan | 51906.8 | |
| | | Feb | 43096.05 | 51906.8 |
| | | Mar | 39772.64 | 43096.05 |
| | Q2 | Apr | 47127.84 | |
| | | May | 47533.14 | 47127.84 |
| | | Jun | 48039.65 | 47533.14 |
| 2000 | Q1 | Jan | 78101.04 | 39772.64 |
| | | Feb | 60420.23 | 78101.04 |
| | | Mar | 48423.11 | 60420.23 |
| | Q2 | Apr | 87177.81 | 48039.65 |
| | | May | 60128.37 | 87177.81 |
| | | Jun | 50534.27 | 60128.37 |

| | Measure | Profit SUM | | | Rank | | |
|---|---|---|---|---|---|---|---|
| | Year | 1900 | 1998 | 1999 | 1900 | 1998 | 1999 |
| Region | City | | | | | | |
| East | Boston | 16912.2 | 23742.91 | 24558.58 | 2 | 2 | 2 |
| | Miami | 5610.31 | 9208.69 | 9230.9 | 1 | 1 | 1 |
| | New York | 71507.43 | 101063.3 | 107215.5 | 3 | 3 | 3 |
| West | Denver | 16440.34 | 21275.33 | 26494.93 | 2 | 2 | 2 |
| | Los Angeles | 4490.07 | 9921 | 10907.49 | 1 | 1 | 1 |

*FIG. 3*

|  |  | Profit SUM | | | Rank | | |
|---|---|---|---|---|---|---|---|
|  |  | 1900 | 1998 | 1999 | 1900 | 1998 | 1999 |
| East | Boston | 16912.2 | 23742.91 | 24558.58 | 2 | 2 | 2 |
|  | Miami | 5610.31 | 9208.69 | 9230.9 | 1 | 1 | 1 |
|  | New York | 71507.43 | 101063.3 | 107215.5 | 3 | 3 | 3 |
| West | Denver | 16440.34 | 21275.33 | 26494.93 | 2 | 2 | 2 |
|  | Los Angeles | 4490.07 | 9921 | 10907.49 | 1 | 1 | 1 |
|  | San Francisco | 32739.67 | 43165.63 | 52834.99 | 3 | 3 | 3 |

*FIG. 4A*

|  |  | Profit SUM | | | Rank | | |
|---|---|---|---|---|---|---|---|
|  |  | 1900 | 1998 | 1999 | 1900 | 1998 | 1999 |
| East | Boston | 16912.2 | 23742.91 | 24558.58 | 4 | 4 | 3 |
|  | Miami | 5610.31 | 9208.69 | 9230.9 | 2 | 1 | 1 |
|  | New York | 71507.43 | 101063.3 | 107215.5 | 6 | 6 | 6 |
| West | Denver | 16440.34 | 21275.33 | 26494.93 | 3 | 3 | 4 |
|  | Los Angeles | 4490.07 | 9921 | 10907.49 | 1 | 2 | 2 |
|  | San Francisco | 32739.67 | 43165.63 | 52834.99 | 5 | 5 | 5 |

*FIG. 4B*

|  |  | Profit SUM | | | Rank | | |
|---|---|---|---|---|---|---|---|
|  |  | 1900 | 1998 | 1999 | 1900 | 1998 | 1999 |
| East | Boston | 16912.2 | 23742.91 | 24558.58 | 1 | 2 | 3 |
|  | Miami | 5610.31 | 9208.69 | 9230.9 | 1 | 2 | 3 |
|  | New York | 71507.43 | 101063.3 | 107215.5 | 1 | 2 | 3 |
| West | Denver | 16440.34 | 21275.33 | 26494.93 | 1 | 2 | 3 |
|  | Los Angeles | 4490.07 | 9921 | 10907.49 | 1 | 2 | 3 |
|  | San Francisco | 32739.67 | 43165.63 | 52834.99 | 1 | 2 | 3 |

*FIG. 4C*

Calculated Item = City (the Detailed Item)

| | | Profit SUM | | | Rank | | |
|---|---|---|---|---|---|---|---|
| | | 1998 | 1999 | 2000 | 1998 | 1999 | 2000 |
| East | | 134014.9 | 141005 | 94029.94 | | | |
| | Boston | 23742.91 | 24558.58 | 16912.2 | 2 | 3 | 2 |
| | Miami | 9208.69 | 9230.9 | 5610.31 | 5 | 5 | 4 |
| | New York | 101063.3 | 107215.5 | 71507.43 | 1 | 1 | 1 |
| West | | 31196.33 | 37402.42 | 20930.41 | | | |
| | Denver | 21275.33 | 26494.93 | 16440.34 | 3 | 2 | 3 |
| | Los Angeles | 9921 | 10907.49 | 4490.07 | 4 | 4 | 5 |

Calculated Item = Region

| | | Profit SUM | | | Rank | | |
|---|---|---|---|---|---|---|---|
| | | 1998 | 1999 | 2000 | 1998 | 1999 | 2000 |
| East | | 134014.9 | 141005 | 94029.94 | 1 | 1 | 1 |
| | Boston | 23742.91 | 24558.58 | 16912.2 | | | |
| | Miami | 9208.69 | 9230.9 | 5610.31 | | | |
| | New York | 101063.3 | 107215.5 | 71507.43 | | | |
| West | | 31196.33 | 37402.42 | 20930.41 | 2 | 2 | 2 |
| | Denver | 21275.33 | 26494.93 | 16440.34 | | | |
| | Los Angeles | 9921 | 10907.49 | 4490.07 | | | |

LAYOUT AWARE CALCULATIONS

CROSS-REFERENCES TO RELATED APPLICATIONS

This application is a continuation of application Ser. No. 10/641,393, filed Aug. 13, 2003, now U.S. Pat. No. 7,590, 613, which is a CIP of application Ser. No. 10/639,291, filed Aug. 11, 2003, which are incorporated herein by reference in their entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to the field of database software generally, and specifically to software applications for analyzing data in a database. A database is typically one or more large sets of structured data. A database is usually associated with a software application adapted to query and update data in the database. A common type of database structure is a relational database. A relational database organizes data and the relationships between data in a set of tables, typically two-dimensional tables organized into rows and columns. SQL, a programming language defining the creation and manipulation of tables, is typically used by database applications to create, update, and query the database.

Relational databases are well suited large databases and for quickly processing database queries. Because of this, relational databases are often used for on-line transaction processing (OLTP) applications, which often require handling millions of transactions a day, with each transaction being processed in real-time or near real-time.

In addition to processing transactions, databases can also be used to perform complex data analysis tasks. Although relational databases perform transaction processing applications efficiently, they are typically very inefficient at transforming or processing large amounts of raw data with analytical functions used for data analysis. Because of this, another type of database structure, known as On-Line Analytical Processing (OLAP), is used for data analysis applications.

OLAP databases enable users to analyze the data and look for patterns, trends, and exceptions. Whereas relational databases use tables and columns to organize their data, OLAP databases generally use dimensions and cubes as their central data structures. Cubes are simply datapoint items (e.g. Profit, Cost). Dimensions are data structures that can specify a hierarchy of items. Examples of dimensions can include things like "Time" and "Geography," for which "Time" might include a hierarchy of (Year, Quarter, Month) and "Geography" might specify a hierarchy of locations, such as (Country, Region, City).

Dimensions are well adapted to allow users to define these analytic calculations. An OLAP database or analysis tool can directly support many types of calculations because it knows the relationship between the items specified by dimensions. For a relational database, analysis is more difficult because data is stored as a group of unrelated columns.

In order provide better analytical capabilities in relational databases without sacrificing performance, data analysis software, such as Oracle Discoverer, have been developed. The data analysis software provides a graphical user interface for analyzing data in a relational database. Users can quickly create, modify, and execute ad-hoc queries, reports, and graphs, using the data analysis software. The data analysis software translates user input from the graphical user interface into specially-created SQL analytic functions, such as those enabled in Oracle 8i. The SQL analytic functions generically partition rows based on columns and compute the functions within those row sets. The SQL statements formulated by the data analysis application are then processed by the database, and the results are displayed in the data analysis application. In this manner, the data analysis application provides relational databases users with "OLAP-type" analysis capabilities.

The functionality introduced by the SQL analytic functions do not, in and of itself, solve the calculation requirements for data analysis software. It is essential that the data analysis tools are easy to use and understand by business users, who do not typically understand the usage of SQL. Data analysis software can present data to users in the form of tables or sheets having cells arranged into rows and columns. User can rearrange the cells on a sheet, or perform filtering or pivot table operations to create different view of data in the database.

A layout specifies the relationship between the cells of the sheet and the data in the database. Typically, SQL statements are associated with the cells for retrieving and processing data from the database. As users change the layout on a sheet, the associated SQL statements often "break" from their intended functionality. This occurs most often with SQL analytic functions, which rely on complicated data partitioning to perform computations. This results in data results that is either invalid or does not reflect the intentions of the user.

Thus, it is desirable for the data analysis software to form correct SQL statements regardless of the layout of cells on a sheet. It is further desirable that users be able to specify complex analytical function on a sheet without having to understand SQL.

BRIEF SUMMARY OF THE INVENTION

The present invention takes into account the layout of a sheet to form analytic database functions. In an embodiment of the invention, a method for analyzing data from a database using an analytic database function comprises receiving a selection of measured items from a user, receiving a placement item from the user, and determining a partitioning of the selection of measured items from the placement item. In one embodiment, the placement item is a column. In another embodiment, the placement item is an axis.

In another embodiment of the invention, a template is associated with the analytic database function and is adapted to define at least one partitioning relative to the placement item. In a further embodiment, the template is further adapted to define an ordering parameter for the analytic database function. One of a set of ordering parameters can be received from the user. In yet a further embodiment, the template is further adapted to define an aggregation level for the analytic database function. One of a set of aggregation levels can be received from the user.

In yet another embodiment, the method further comprises creating a database query including the partitioning. In one embodiment, this database query includes an SQL statement.

BRIEF DESCRIPTION OF THE DRAWINGS

The present invention will be discussed with reference to the drawings, in which:

FIG. 2 illustrates the partitioning of a set of rows for an analytical function;

FIG. 3 illustrates a sheet having a layout aware calculation according to an embodiment of the invention;

FIGS. 4A, 4B, and 4C illustrate the results of an example layout aware calculation in response to changes in a layout according to an embodiment of the invention;

FIGS. 5A and 5B illustrate different aggregation levels of the results of an example layout aware calculation according to an embodiment of the invention.

DETAILED DESCRIPTION OF THE INVENTION

An embodiment of the present invention takes into account the layout of a sheet to form the SQL statements associated with cells. In this embodiment, these SQL statements, referred to as layout aware calculations, inherit their partitioning from the layout of a sheet. As user rearrange the cells of a sheet, the layout is changed and the SQL statements are updated appropriately. This enables the SQL analytic functions associated with cells to produce valid data calculations that reflect the intent of the user. Additionally, users are able to specify complex analytical functions merely by rearranging cells, without any knowledge of SQL.

Figure 1:
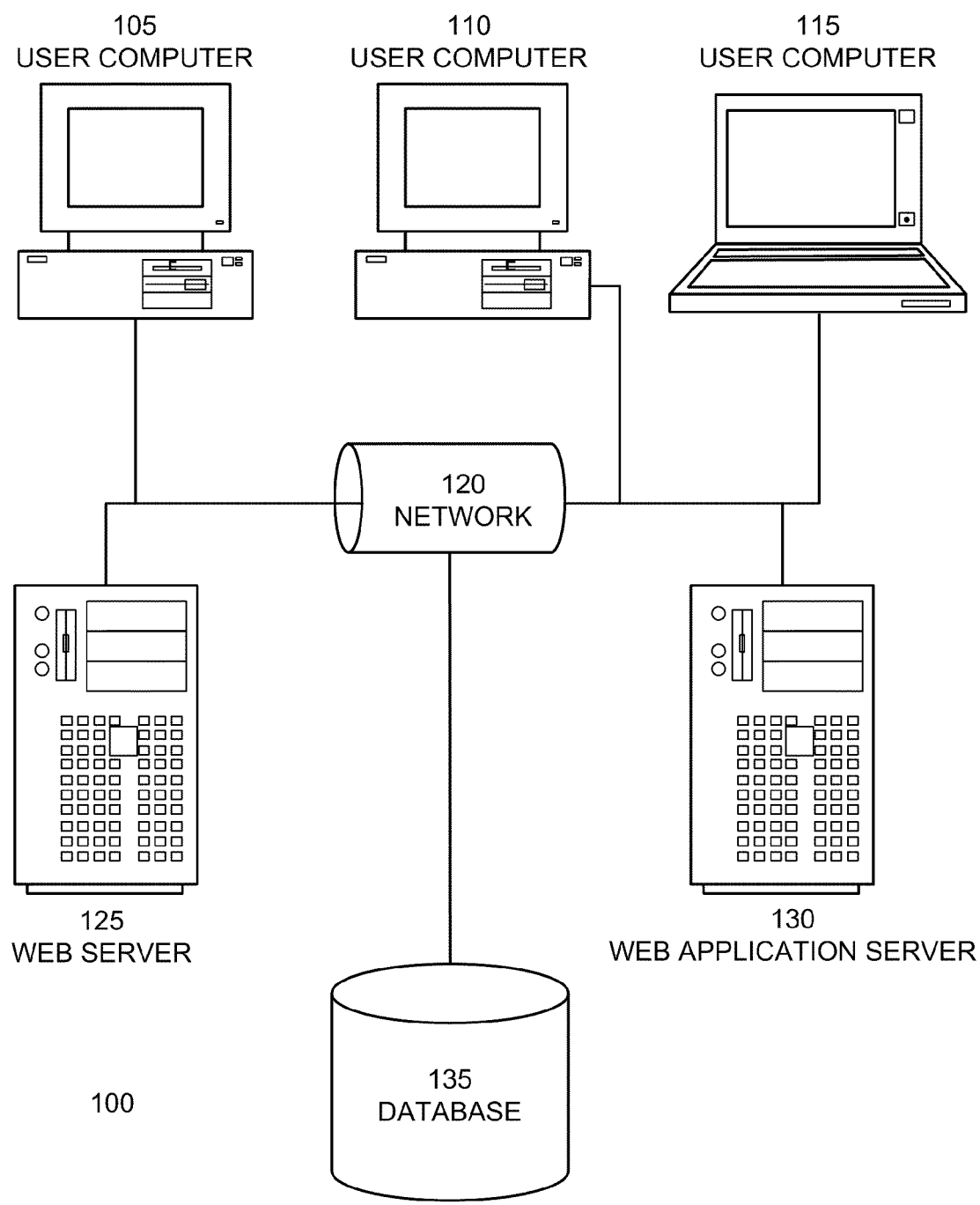
FIG. 1 is a block diagram of a system for implementing an embodiment of the invention.

FIG. 1 is a block diagram of a system 100 for implementing an embodiment of the invention. System 100 includes user computers 105, 110, and 120. User computers 105, 110, and 120 can be general purpose personal computers having web browser applications. Alternatively, user computers 105, 110, and 120 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web server 125 is used to process requests for web pages or other electronic documents from user computers 105, 110, and 120. In an embodiment of the invention, the data analysis software operates within a web browser on a user computer. In this embodiment, all user interaction with the data analysis software is via web pages sent to user computers via the web server 125.

Web application server 130 operates the data analysis software. In an embodiment, the web application server 130 is one or more general purpose computers capable of executing programs or scripts in response to the user computers 105, 110 and 115. The web application can be implemented as one or more scripts or programs written in any programming language, such as Java™, C, or C++, or any scripting language, such as Perl, Python, or TCL.

In an embodiment, the web application server 130 dynamically creates web pages for displaying the data analysis software. The web pages created by the web application server 130 are forwarded to the user computers via web server 125. Similarly, web server 125 receives web page requests and input data from the user computers 105, 110 and 120, and forwards the web page requests and input data to web application server 130.

The data analysis application on web application server 130 processes input data and user computer requests and can be stored or retrieved data from database 135. Database 135 stores data created and used by the enterprise. In an embodiment, the database 135 is a relational database, such as Oracle 9i, that is adapted to store, update, and retrieve data in response to SQL format commands.

An electronic communication network 120 enables communication between computers 105, 110, and 115, web server 125, web application server 130, and database 135. In an embodiment, network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing a data analysis software according to an embodiment of the invention. In another embodiment, web application server 130, web server 125, and optionally database 135 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

Many SQL analytic functions rely on an ordered set of rows. As part of the function syntax, users define partitions, which are subsets of the ordered set of rows. The partitioning of rows determines the inputs to an SQL analytic function, and consequently, the output of the SQL analytic function as well. Previously, the partitioning of data for a SQL analytic function is determined independently of the layout of the sheet and is fixed. Because the partitioning of the SQL analytic function is independent of the layout, as users change the layout, the partitioning no longer matches the layout, and the SQL analytic function produces incorrect results.

FIG. 2 illustrates the partitioning of a set of rows for an analytical function. FIG. 2 illustrates how a change in layout leads to incorrect results from an SQL analytic function. Example sheet 210 shows a layout for calculating the profit of a quarter in the previous year with the profit in the same quarter of the current year. The SQL analytic function, "Lag," locates the appropriate profit values and displays the results in the "Lag by Year" column. In sheet 210, the SQL analytic function uses its partitions to define the location of its inputs. An example of an SQL analytic function used in sheet 210 is "LAG (Profit SUM,1) OVER(PARTITION BY Quarter ORDER BY Year)."

As discussed above, the data analysis software enables users to graphically manipulate the arrangement of cells on a sheet. In sheet 210, for example, a user has added a new column for "Months." In this example, sheet 210 displays profit values by quarter and month. Because the position of cells has changed in sheet 210 from their original positions in sheet 205, the "Lag" function computes incorrect values in sheet 210. For example, cell 215 displays the profit from the previous month of the same year, rather than the profit of the same month of the previous year. The example of FIG. 2 illustrates how the addition of a column of information "breaks" previously implemented SQL analytic functions. Similar problems with SQL analytic functions can result from many other modifications to a sheet, such as pivots, drills, or change in cell locations.

To resolve these problems with SQL analytic functions, an embodiment of the present invention specifies calculations in a way that they can inherit their partitioning from the layout of the sheet. As users change the layout, the partitioning of the SQL analytic functions changes as well, so that the calculations remain correct.

FIG. 3 illustrates a sheet 300 having a layout aware calculation according to an embodiment of the invention. Layout aware calculations are any calculations that inherit part of their semantic from the layout of a sheet. SQL analytic functions are one class of calculations that can use layout aware calculations. Any other functions that depend on the positioning of input can also use layout aware calculations.

Example sheet 300 shows a profit values for regions and for cities with in each region. For example, the "East" region includes the cities of "Boston," "Miami," and "New York." A detail item is defined as the lowest level of classification for a set of data values. In this example, the detail item on the Y-axis is the "City" column 305. As discussed below, the detail item is used to create a layout aware calculation.

Additionally, a layout aware calculation defines a measure item as the datapoint or measure that is being used for the calculation. In example sheet 300, the measure item for the "Rank" calculation is "Profit SUM." In this example, the Rank calculation will rank cities or regions by the value of its "Profit SUM." The resulting Rank calculation is displayed in the appropriate "Rank" column in sheet 300.

In example sheet 300, users may want to use the rank function to rank profit values either by individual city, by region, or by city within each region. This partitioning of the input data is determined by selecting a placement item. A placement item is used to define the partitioning, or "bucketing" of the analytic function, such as the rank function. In the example of sheet 300, the region column 310 is selected as the placement item. As a result, the layout aware calculation computes the rank of each cities' profit within its region.

For example, "Boston" has a rank of "2" within the "East" region in the year 1900, as shown in cell 315. Similarly, "Denver" has a rank of "2" within the "West" region, as shown in cell 320. Alternatively, if the "City" column 305 had been selected as the placement item, then the cities would have been ranked against each other regardless of region. In this alternate example (not shown in FIG. 3), the cities of "Boston" and "Denver" would be ranked against each other, with "Boston" having a rank of "3" and "Denver" having a rank of "4." (In this example, profits are ranked from lowest to highest).

The data analysis software uses the placement item to determine the appropriate partitioning of the measured items and formats the analytic function accordingly. In an embodiment, the data analysis software creates a SQL statement defining the partitioning of the measured items, the desired analytic function or functions to be performed on the measured items, and the location of the cells containing the results of the function or functions. In an embodiment of the invention, a generic pseudo SQL statement for defining a Layout Aware Calculation looks like:

Compute <function> within <placement item> based on <measure item>

[at aggregation level <calculated item>]

In this pseudo SQL statement, the function can be any analytical function, such as Rank, Lag, or Cumulative Sum, and the other items are defined above. The optional "[at aggregation level <calculated item>]" allows for the selection of a specific "sublevel" and is discussed in more detail below.

For each analytic function, a function template is defined that determines the partition according to the placement item. Table 1 illustrates example function templates for several analytic functions.

TABLE 1

Function Templates for Determining Partition from Placement Item

| Function | Partition By | Order By |
|---|---|---|
| Rank | All items "above" the placement item; All items on the opposite axis. | Measure, Ascending or Descending Rank chosen by the user. |
| Lag/Lead | All items except the placement item. | The placement item, ascending/descending inherited from the display |
| Cumulative Sum | All items "above" the placement item; All items on the opposite axis. | All items "below" the placement item; ascending/descending inherited from the display |

In Table 1, the partition is selected according to the rule defined by the function template associated with an analytic function. In an embodiment, these function templates are built into the data analysis software and are based on generalizations of typical layouts associated with the usage of analytic functions. In an embodiment, the "Order By" and "Partition By" are parameters of analytic functions. For many types of analytic functions, such as Cumulative Sum and Lag/Lead, the placement item determines the value of the "Order By" and "Partition By" elements and use the measure item to determine the measure of the analytic functions.

However, there may be exceptions to this, for example an embodiment of the Rank function, which determines the "Order By" parameter from the measure item. In this embodiment, the user directly selects whether items are ranked in ascending order or descending order.

Analytic functions can be constructed in a number of different ways by users. In an embodiment, the user can selects the placement item on a sheet. Following the selection of the placement item, this embodiment of the data analysis software presents a window, dialog box, or other user interface element to the user that enables the user to specify the "Order By" parameter. In a further embodiment, a set of alternate "Order By" parameters are presented to the user in this window. The user selects one of the "Order By" parameters. The data analysis software determines the set of alternate "Order By" parameters from the function template.

The following example illustrates the construction and operation of an analytic function according to an embodiment of the invention. Assuming a layout as shown in sheet 300 of FIG. 3, a user may want to add a template calculation: "Cumulative SUM" within "Region" based on "Profit SUM"

Applying the example templates defined in Table 1 to the layout of FIG. 3, the following SQL analytic function can be generated:

"SUM(Profit SUM) OVER(PARTITION BY Region, Year ORDER BY City)"

Table 2 illustrates a hypothetical database table associated with the layout sheet 300 of FIG. 3.

TABLE 2

Example Database Table

| Region | City | Year | Profit SUM |
|---|---|---|---|
| East | Miami | 1998 | 9208.69 |
| East | Boston | 1998 | 23742.91 |
| West | Denver | 1998 | 21275.33 |
| East | New York | 1998 | 101063.3 |
| West | Los Angeles | 1998 | 9921 |
| East | Miami | 1999 | 9230.9 |
| East | Boston | 1999 | 24558.58 |
| West | Denver | 1999 | 26494.93 |
| East | New York | 1999 | 107215.5 |
| West | Los Angeles | 1999 | 10907.49 |
| East | Miami | 2000 | 5610.31 |
| East | Boston | 2000 | 16912.2 |
| West | Denver | 2000 | 16440.34 |
| East | New York | 2000 | 71507.43 |
| West | Los Angeles | 2000 | 4490.07 |

Applying the example generated SQL analytic function to the database table of Table 2, the example SQL analytic function partitions the database table by Region, Year combinations, as shown in Table 3.

TABLE 3

Example Database Partitioning

| Region | Year | City | Profit SUM |
|---|---|---|---|
| East | 1998 | Miami | 9208.69 |
| East | 1998 | Boston | 23742.91 |
| East | 1998 | New York | 101063.3 |
| East | 1999 | Miami | 9230.9 |
| East | 1999 | Boston | 24558.58 |
| East | 1999 | New York | 107215.5 |
| East | 2000 | Miami | 5610.31 |
| East | 2000 | Boston | 16912.2 |
| East | 2000 | New York | 71507.43 |
| West | 1998 | Denver | 21275.33 |
| West | 1998 | Los Angeles | 9921 |
| West | 1999 | Denver | 26494.93 |
| West | 1999 | Los Angeles | 10907.49 |
| West | 2000 | Denver | 16440.34 |
| West | 2000 | Los Angeles | 4490.07 |

Following the partitioning of the database table by Region and Year, the cells within each partition are sorted in the order of the 'Order By' paramter, which in this example is City, so that within each partition the rows are cumulatively added up in the same order. The results of this sorting is shown in Table 4.

TABLE 4

Example Database Table Sorting

| Region | Year | City | Profit SUM |
|---|---|---|---|
| East | 1998 | Boston | 23742.9 |
| East | 1998 | Miami | 9208.6 |
| East | 1998 | New York | 101063.3 |
| East | 1999 | Boston | 24558.5 |
| East | 1999 | Miami | 9230.9 |
| East | 1999 | New York | 107215.5 |
| East | 2000 | Boston | 16912.2 |
| East | 2000 | Miami | 5610.3 |
| East | 2000 | New York | 71507.4 |
| West | 1998 | Denver | 21275.3 |
| West | 1998 | Los Angeles | 9921.0 |
| West | 1999 | Denver | 26494.9 |
| West | 1999 | Los Angeles | 10907.4 |
| West | 2000 | Denver | 16440.3 |
| West | 2000 | Los Angeles | 4490.0 |

Finally the Cumulative SUM is computed within each partition.

TABLE 5

Example Cumulative SUM results

| Region | Year | City | Profit SUM | Cum SUM |
|---|---|---|---|---|
| East | 1998 | Boston | 23742.91 | 23742.9 |
| East | 1998 | Miami | 9208.69 | 32951.6 |
| East | 1998 | New York | 101063.3 | 134014.9 |
| East | 1999 | Boston | 24558.58 | 24558.5 |
| East | 1999 | Miami | 9230.9 | 33789.4 |
| East | 1999 | New York | 107215.5 | 141005.0 |
| East | 2000 | Boston | 16912.2 | 16912.2 |
| East | 2000 | Miami | 5610.31 | 22522.5 |
| East | 2000 | New York | 71507.43 | 94029.9 |
| West | 1998 | Denver | 21275.33 | 21275.3 |
| West | 1998 | Los Angeles | 9921 | 31196.3 |
| West | 1999 | Denver | 26494.93 | 26494.9 |
| West | 1999 | Los Angeles | 10907.49 | 37402.4 |
| West | 2000 | Denver | 16440.34 | 16440.3 |
| West | 2000 | Los Angeles | 4490.07 | 20930.4 |

Figure 6:
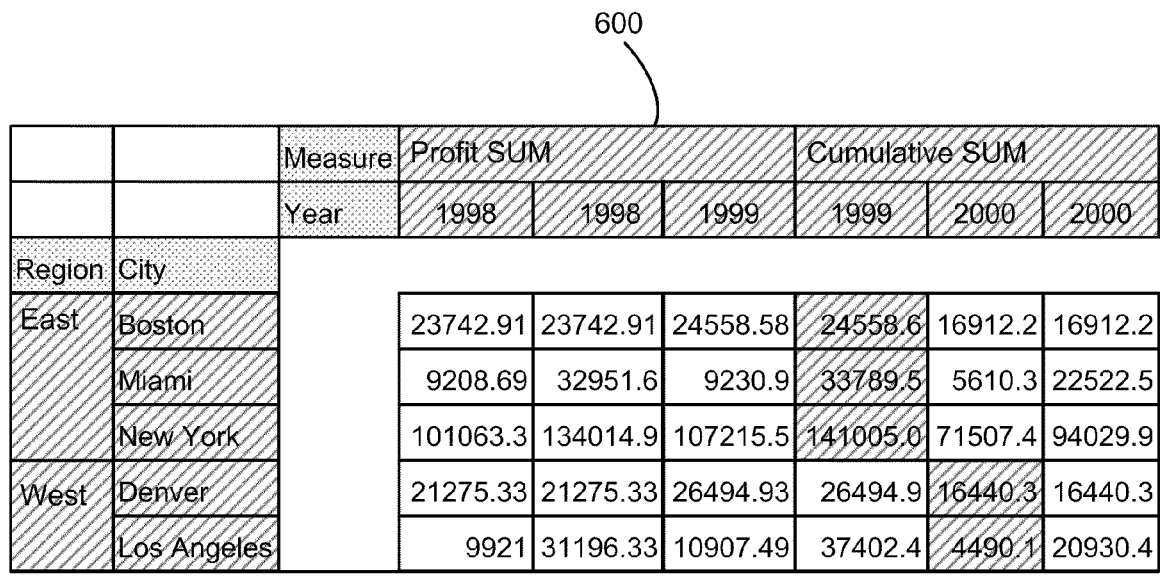
FIG. 6 illustrates a sheet having a layout aware calculation according to an embodiment of the invention.

The result of the Cumulative sum calculation can then be displayed in the revised layout 600 of FIG. 6.

FIGS. 4A, 4B, and 4C illustrate the results of an example layout aware calculation in response to different placement items according to an embodiment of the invention. FIG. 4A illustrates example sheet 405. On example sheet 405, the "Rank" columns, such as column 420, use the rank analytic function. In conjunction with the rank function in column 420, a user has selected the "Region" column 410 as the placement item. In accordance with the function template associated with the rank function, the data analysis software partitions the measured items in the "Profit SUM" column of sheet 405 by region.

In FIG. 4A, this partitioning is indicated by the alternating shaded regions. For example, partition 415 represents the "Profit SUM" in the "East" region, and partition 425 represents the "Profit Sum" in the "West" region. In response to the division of the measured items in this column into partitions 415 and 425, the rank analytic function will rank cities within each region separately.

FIG. 4B illustrates example sheet 430. Example sheet 430 also uses the rank function. On sheet 430, the entire Y-axis is selected as the placement item. In accordance with the function template associated with the rank function, the data analysis software creates a single partition of the measured items in each column, such as partition 435. In response to the creation of a single partition of measured items in each column, the rank analytic function will rank all of the cities across all of the regions together.

FIG. 4C illustrates example sheet 450. Like sheets 405 and 430, sheet 450 also uses the rank function. On sheet 450, the entire X-axis is selected as the placement item. In accordance with the function template associated with the rank function, the data analysis software creates a partition of the measured items in each row, such as partitions 455 and 460. In response to the partitioning by row, the rank analytic function will rank the profits along the x-axis from each city separately.

FIGS. 5A and 5B illustrate different aggregation levels of the results of an example layout aware calculation according to an embodiment of the invention. The aggregation level is the level of classification used to compute the calculated items. As discussed above, the detail item is the lowest level of classification for a set of data values. Some layouts can have one or more higher levels of classification. In the examples of FIGS. 4A-4C, data items can be classified by city, which is the detail item, or by region, which represents a higher level of classification. As shown in the pseudo SQL statement above, the result of an analytic function can be affected by the choice of an aggregation level. For example, a rank function can be used to rank profits from cities within a region, or to rank regions based on their total profits.

The user can select an aggregation level for a layout aware calculation. In one embodiment, the data analysis software presents a window or a dialog box to the user that enables the user to specify the aggregation level. This window is presented to the user following the selection of the placement item. In a further embodiment, the data analysis software presents a set of alternate aggregation levels to the user, from which the user selects the desired aggregation level. The data analysis software determines the set of alternate aggregation levels from the function template and the placement item.

FIG. 5A illustrates an example sheet 505 using the city column 510 as the aggregation level. In sheet 505, the rank function ranks cities within each region. FIG. 5B illustrates an example sheet 520 using the region column as the aggregation level. In sheet 520, the rank function ranks regions based on their total profits.

Although the invention has been discussed with respect to specific embodiments thereof, these embodiments are merely illustrative, and not restrictive, of the invention. For example, although the invention is discussed with reference to SQL analytic functions, the invention can be used to analyze data using any type of database function expressed in any format. Thus, the scope of the invention is to be determined solely by the claims.

What is claimed is:

1. A computer-implemented method for analyzing data using analytic database functions, the method comprising:
   displaying a layout having a plurality of cells on a display device using a graphical user interface configured to enable users to manipulate arrangement of the plurality of cells within the graphical user interface, the layout specifying relationships between each cell in the plurality of cells and data in a database;
   receiving first user input at a computer system, the first user input indicative of a selection made by a user on the layout via the graphical user interface of one or more measured items in cells associated with the layout;
   receiving second user input at the computer system, the second user input indicative of a selection made by a user on the layout via the graphical user interface of a placement item in a cell associated with the layout;
   determining at the computer system a template associated with an analytic database function, the template configured to define:
      at least one partitioning of the one or more measured items relative to the placement item,
      a rule that enables the computer system to select the at least one partitioning for use when formatting the analytic database function, and
      a set of aggregation levels for the analytic database function;
   receiving third user input at the computer system, the third user input indicative of a selection made by the user on the layout displayed on the display device of one of the set of aggregation levels defined by the template;
   determining with the computer system a partitioning associated with the analytic database function of the one or more measured items selected by the user on the layout based on the placement item selected by the user on the layout;
   formatting with the computer system the analytic database function associated with a cell in the plurality of cells of the layout displayed on the display device based on the determined partitioning of the one or more measured items, the analytic database function formatted by the computer system to include the determined partitioning of the one or more measured items, one or more functions to be performed on the one or more measured items, and location of the cell within the layout to contain a resulting item for the one or more functions; and
   displaying the resulting item in the cell of the layout displayed on the display device.

2. The method of claim 1, wherein the template is further configured to define a set of ordering parameters for the analytic database function.

3. The method of claim 2, further comprising receiving third user input at the computer system, the third user input indicative of a selection made by the user on the layout displayed on the display device of one of the set of ordering parameters defined by the template.

4. The method of claim 1, wherein formatting with the computer system the analytic database function associated with the cell based on the determined partitioning of the one or more measured items comprises:
   creating a database query with the computer system including the determined partitioning.

5. The method of claim 4, wherein the database query includes an SQL statement.

6. The method of claim 1, wherein the placement item comprises a column.

7. The method of claim 1, wherein the placement item comprises an axis.

8. A system for analyzing data, the system comprising:
   a processor; and
   a memory coupled to the processor, the memory configured to store a set of instructions which when executed by the processor cause the processor to:
      display a layout having a plurality of cells on a display device using a graphical user interface configured to enable users to manipulate arrangement of the plurality of cells within the graphical user interface, the layout specifying relationships between each cell in the plurality of cells and data in a database;
      receive input indicative of a selection made by a user on the displayed layout via the graphical user interface of a set of measured items in cells associated with the layout;
      receive input indicative of a selection made by a user on the displayed layout via the graphical user interface of a placement item in a cell associated with the layout;
      determine a template associated with an analytic database function, the template configured to define:
         at least one partitioning of the one or more measured items relative to the placement item,
         a rule that enables the computer system to select the at least one partitioning for use when formatting the analytic database function, and
         a set of aggregation levels for the analytic database function;
      receive third user input indicative of a selection made by the user on the layout displayed on the display device of one of the set of aggregation levels defined by the template;

determine a partitioning associated with the analytic database function of the set of measured items selected by the user on the layout based on the placement item selected by the user on the layout;

format the analytic database function associated with a cell in the plurality of cells of the layout based on the determined partitioning of the set of measured items, the analytic database function formatted by the processor to include the determined partitioning of the one or more measured items, one or more functions to be performed on the one or more measured items, and location of the cell within the layout to contain a resulting item for the one or more functions; and modify the display of the layout on the display device using the graphical user interface with the resulting item.

9. The system of claim 8, wherein the template is further configured to define a set of ordering parameters for the analytic database function.

10. The system of claim 9, further comprising a user interface element adapted to receive one of set of ordering parameters from the user.

11. The system of claim 8, wherein the analytic database function includes a database query.

12. The system of claim 11, wherein the database query includes an SQL statement.

13. The system of claim 8, further comprising a sheet associated with the layout, the sheet defining a set of cells containing the set of measured items, the placement item, and the resulting item.

14. The system of claim 13, wherein the placement item comprises a column of cells.

15. The system of claim 13, wherein the placement item comprises an axis of the sheet.

16. An information storage medium configured to store a plurality of instructions which when executed by a processor direct an information processing device to perform the steps of:

displaying a layout having a plurality of cells on a display device using a graphical user interface configured to enable users to manipulate arrangement of the plurality of cells within the graphical user interface, the layout specifying relationships between each cell in the plurality of cells and data in a database;

receiving a selection made by a user on the layout via the graphical user interface of one or more measured items in cells associated with the layout;

receiving a selection made by the user on the layout via the graphical user interface of a placement item in a cell associated with the layout;

determining a template associated with an analytic database function, the template configured to define:
at least one partitioning of the one or more measured items relative to the placement item,
a rule that enables the computer system to select the at least one partitioning for use when formatting the analytic database function, and
a set of aggregation levels for the analytic database function;

receiving a selection made by the user on the layout displayed on the display device of one of the set of aggregation levels defined by the template;

determining a partitioning associated with the analytic database function of the one or more measured items selected by the user on the layout from the placement item selected by the user on the layout;

format the analytic database function associated with a cell in the plurality of cells of the layout based on the determined partitioning of the one or more measured items, the analytic database function formatted to include the determined partitioning of the one or more measured items, one or more functions to be performed on the one or more measured items, and location of the cell within the layout to contain a resulting item for the one or more functions; and display the resulting item in the cell of the layout displayed on the display device.

17. The information storage medium of claim 16, wherein the template is further configured to define a set of ordering parameters for the analytic database function.

18. The information storage medium of claim 17, further comprising code for receiving one of the set of ordering parameters from the user.

19. The information storage medium of claim 16, wherein the code for formatting the analytic database function associated with the cell based on the determined partitioning of the one or more measured items further comprises code for creating a database query including the partitioning.

20. The information storage medium of claim 19, wherein the database query includes an SQL statement.

21. The information storage medium of claim 16, wherein the placement item comprises a column.

22. The information storage medium of claim 16, wherein the placement item comprises an axis.

* * * * *